(12) United States Patent
Handa et al.

(10) Patent No.: US 6,521,851 B2
(45) Date of Patent: Feb. 18, 2003

(54) BRAKE LEVER CONJUNCTIVE SWITCH DEVICE

(75) Inventors: Akio Handa, Saitama (JP); Hitoshi Furuhashi, Saitama (JP); Katsumi Ebara, Saitama (JP)

(73) Assignee: Honda Giken Kogyo Kabushiki Kaisha, Tokyo (JP)

(*) Notice: Subject to any disclaimer, the term of this patent is extended or adjusted under 35 U.S.C. 154(b) by 0 days.

(21) Appl. No.: 09/820,987

(22) Filed: Mar. 30, 2001

(65) Prior Publication Data

US 2001/0025774 A1 Oct. 4, 2001

(30) Foreign Application Priority Data

Mar. 30, 2000 (JP) .................................. 2000-095163
Dec. 4, 2000 (JP) .................................. 2000-368416

(51) Int. Cl.$^7$ ................................................ H01H 9/06
(52) U.S. Cl. ................................ 200/61.87; 200/61.85
(58) Field of Search ........................ 200/61.87, 61.85, 200/61.88; 307/112–119

(56) References Cited

U.S. PATENT DOCUMENTS 4,275,280 A * 6/1981 Yamazaki ................. 200/61.85
4,501,340 A * 2/1985 Yoshida ..................... 137/351

FOREIGN PATENT DOCUMENTS

| JP | 6-196043 | * | 7/1994 |
| JP | 10297364 | | 11/1998 |

* cited by examiner

Primary Examiner—Elvin Enad
Assistant Examiner—Lisa N Klaus
(74) Attorney, Agent, or Firm—Birch, Stewart, Kolasch & Birch, LLP

(57) ABSTRACT

A brake lever conjunctive switch is provided which is capable of making the operating timings of a pair of switches different while minimizing changes in the shape of a switch box. The brake lever conjunctive switch includes a switch box to which a brake lever is pivotally attached. A pair of switches are mounted in the switch box. The switches are disposed in parallel along the axial direction of pivoting of the brake lever. The brake lever is provided with a first contact member for operating one of the switches when the brake lever is turned by a predetermined angle. The brake lever is further provided with a second contact member located on the pivot shaft of the brake lever for operating the other of the switches by being oscillated by the brake lever when the brake lever is pivoted by not less than the predetermined angle.

20 Claims, 5 Drawing Sheets

BRAKE LEVER CONJUNCTIVE SWITCH DEVICE

BACKGROUND OF THE INVENTION

1. Field of the Invention

The present invention relates to a brake lever conjunctive switch device used for motorcycles and saddle seat vehicles.

2. Description of the Background Art

Motorcycles and three-wheeled or four-wheeled saddle seat vehicles typically include a brake lever at the steering handle for braking the vehicle. A brake lamp switch for turning on a brake lamp at the time of braking is generally provided beside the brake lever.

Some of these vehicles comprise an inhibitor switch for enabling starting of the engine when the brake is operated by a brake lever and the vehicle is thereby stopped. The inhibitor switch is operated by the brake lever, together with the brake lamp switch. The operation timings of the brake lamp switch and the inhibitor switch are set to be different from each other.

A brake lever conjunctive switch having the function to set the operation timings different from each other has been proposed by the present Applicant in Japanese Patent Laid-open No. 10-297364 (1998). The technology proposed therein comprises a switch box, a swing plate fitted to the switch box to swing in conjunction with a brake lever, a plurality of push rods fitted to a switch case so as to be pressed down by the swing plate, the push rods differing in distance from the center of rotation of the swing plate, and switch means facing the push rods. However, the switch means have special structures and, therefore, there is a problem that the shape of the switch box must be amply changed.

SUMMARY OF THE INVENTION

It is therefore an object of the present invention to provide a brake lever conjunctive switch capable of making the operation timings of a pair of switches different while minimizing the change in the shape of the switch box.

In order to attain the object, a brake lever conjunctive switch device of the present invention comprises a switch box to which a brake lever is turnably fitted, and a pair of switches mounted in the switch box, wherein the switches are disposed in parallel along the axial direction of turning of the brake lever. One of the switches is a stop lamp switch, and the other of the switches is an inhibitor switch.

A first contact member is provided on the brake lever for operating one of the switches when the brake lever is turned by a predetermined angle. A second contact member is provided on the axis of turning of the brake lever for operating the other of the switches by being oscillated by the brake lever when the brake lever is turned by not less than the predetermined angle.

The second contact member is provided with a contact piece opposed to the first contact member with a predetermined space therebetween along the direction of oscillation thereof. The first contact member is brought into contact with the contact piece, whereby the second contact piece is oscillated when the brake lever is turned by not less than the predetermined angle.

Further scope of applicability of the present invention will become apparent from the detailed description given hereinafter. However, it should be understood that the detailed description and specific examples, while indicating preferred embodiments of the invention, are given by way of illustration only, since various changes and modifications within the spirit and scope of the invention will become apparent to those skilled in the art from this detailed description.

DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION OF THE PREFERRED EMBODIMENTS

Figure 1:
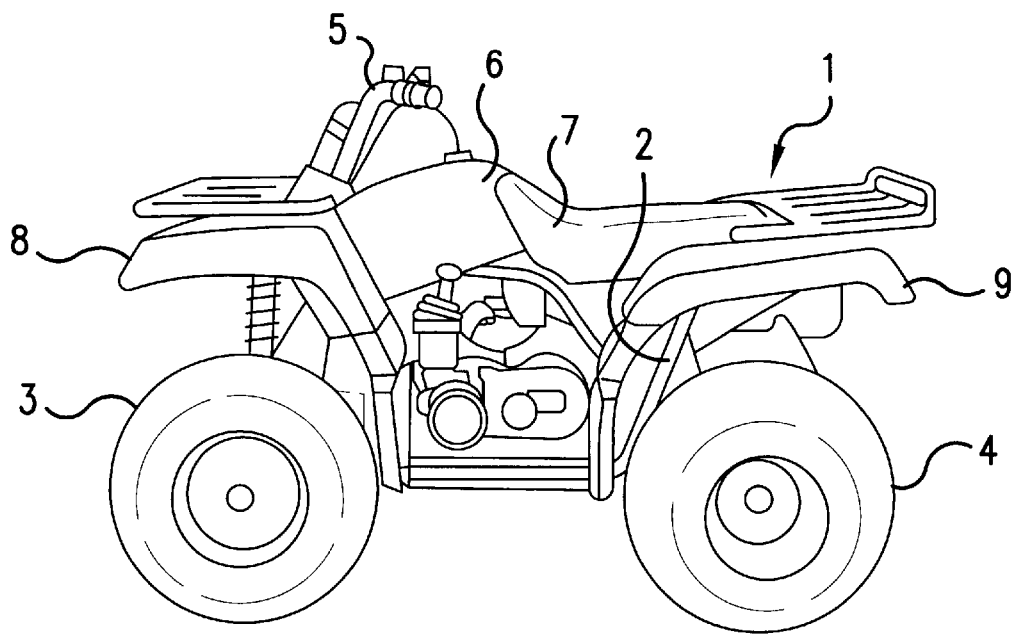
FIG. 1 is a side view showing a four-wheeled saddle seat vehicle to which one embodiment of the invention has been applied.

An embodiment of the invention will now be described with reference to the drawings. As shown in FIG. 1, a vehicle 1 comprises a vehicle body frame 2. Front wheels 3 are disposed at both side portions of a front portion of the vehicle body frame 2, and rear wheels 4 are disposed on both sides of a rear portion of the vehicle body frame 2. A steering handle 5 is disposed on the upper side of a front portion of the vehicle body frame 2 for steering the front wheels 3.

A fuel tank 6 is mounted on the rear side of the steering handle 5, and a seat 7 is fitted on the rear side of the fuel tank 6. A front fender 8 is disposed to cover the upper side of the front wheels 3, and a rear fender 9 is disposed to cover the upper side of the rear wheels 4.

Figure 2:
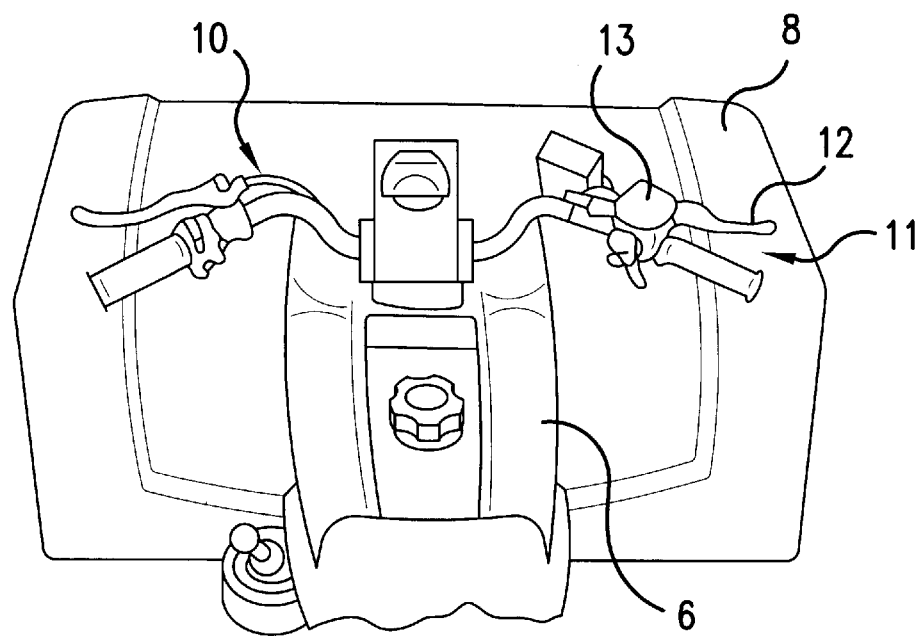
FIG. 2 is a plan view of a major portion of the four-wheeled saddle seat vehicle to which the embodiment of the invention has been applied.

As shown in FIG. 2, brake devices 10, 11 for braking the vehicle 1 are provided at both end portions of the steering handle 5. The brake device 11 on one side is provided with a brake lever conjunctive switch according to the present embodiment.

Figure 3:
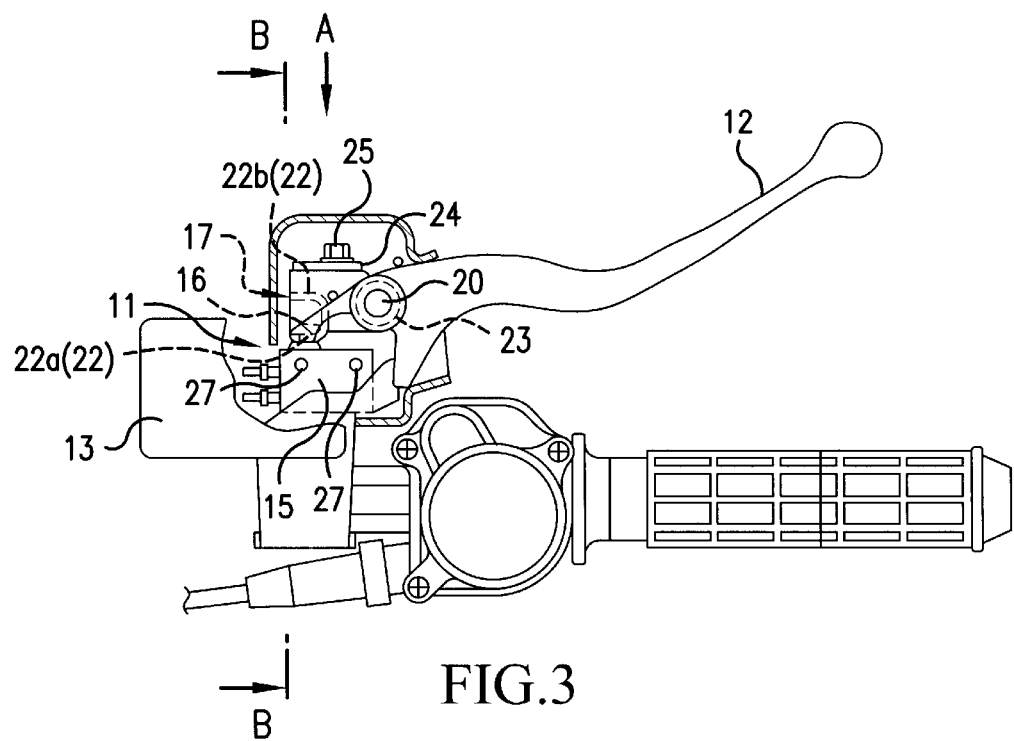
FIG. 3 is a partially broken plan view showing a major portion of the embodiment of the invention.
Figure 4:
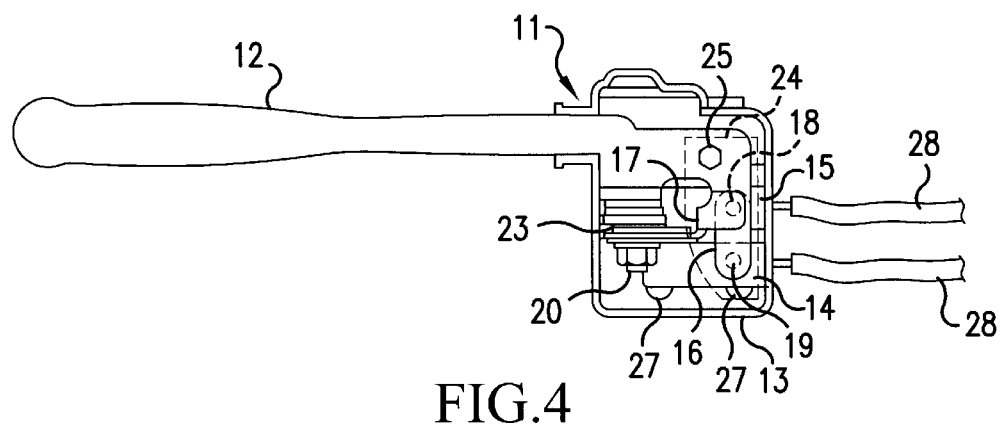
FIG. 4 is a view taken along arrow A of FIG. 3.

As shown in FIGS. 3 and 4, the brake lever conjunctive switch comprises a switch box 13 to which a brake lever 12 is pivotally attached, and a pair of switches 14, 15 mounted in the switch box 13. The switches 14, 15 are disposed in parallel along the axial direction of pivoting of the brake lever 12.

A first contact member 16 is provided on the brake lever 12 for operating one of the switches 14 when the brake lever 12 is turned by a predetermined angle. A second contact member 17 is provided on the axis of turning of the brake lever 12 for operating the other of the switches 15 by being oscillated by the brake lever 12 when the brake lever 12 is turned by not less than the predetermined angle.

The switches 14, 15 are the same type of switch. One of the switches is a brake lamp switch 14, while the other of the switches is an inhibitor switch 15. Operating pins 18, 19 of the switches 14, 15 are located in the same plane parallel to a pivotal shaft 20 of the brake lever 12.

The first contact member 16 is provided as one body with the brake lever 12, and is located to overlap with the operating pins 18, 19. At the position opposed to the inhibitor switch 15, the first contact member 16 is provided with a cutaway 21 through which a portion of the second contact member 17 is passed.

The second contact member 17 is oscillatably provided on the pivotal shaft 20, and is provided, at its end portion of oscillation, with a contact piece 22 which has a U-shaped cross section and through which the first contact member 16 is passed.

The contact piece 22 has its one end portion 22a (the lower end portion in FIG. 3 and FIG. 5) passed through the cutaway 21 of the first contact member 16 and brought into contact with the operating pin 19 of the inhibitor switch 15.

The other end portion 22b (the upper end portion in FIG. 3 and FIG. 5) of the second contact piece 17 is located on the opposite side of the one end portion 22a with respect to the first contact member 16, and is located on the locus of movement of the first contact member 16.

The one end portion 22a and the other end portion 22b of the second contact piece 17 are spaced apart at such an interval that only the first contact member 16 is moved a predetermined distance during a turning operation of the brake lever 12.

The brake lever 12 is biased by a spring (not shown) in such a direction that the first contact member presses down the operating pin 18 of the brake lamp switch 14. The second contact member 17 is biased by a spring 23 fitted onto the pivotal shaft 20 in such a direction that the one end portion 22a presses down the operating pin 19 of the inhibitor switch 15.

Figure 5:
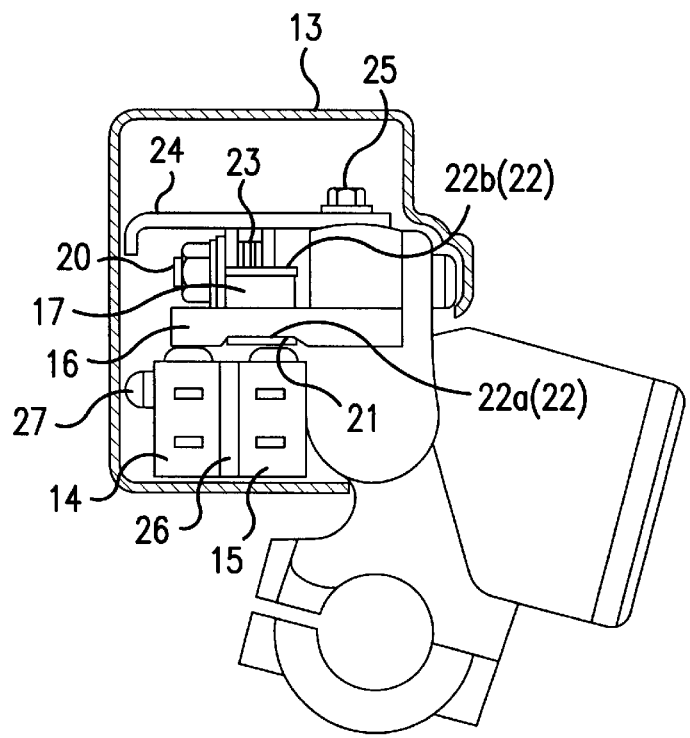
FIG. 5 is a sectional view taken along line B—B of FIG. 3, for illustrating the operation of the embodiment of the invention in a first position.

A guide plate 24 is provided so as to cover the second contact member 17, and is fixed to the brake lever 12 by a bolt 25. As shown in FIG. 5, the switches 14 and 15 are disposed with a spacer 26 therebetween, and are fixed by a bolt 27 penetrating therethrough. As shown in FIG. 4, signal lines 28 are connected to the switches 14 and 15.

Figure 8:
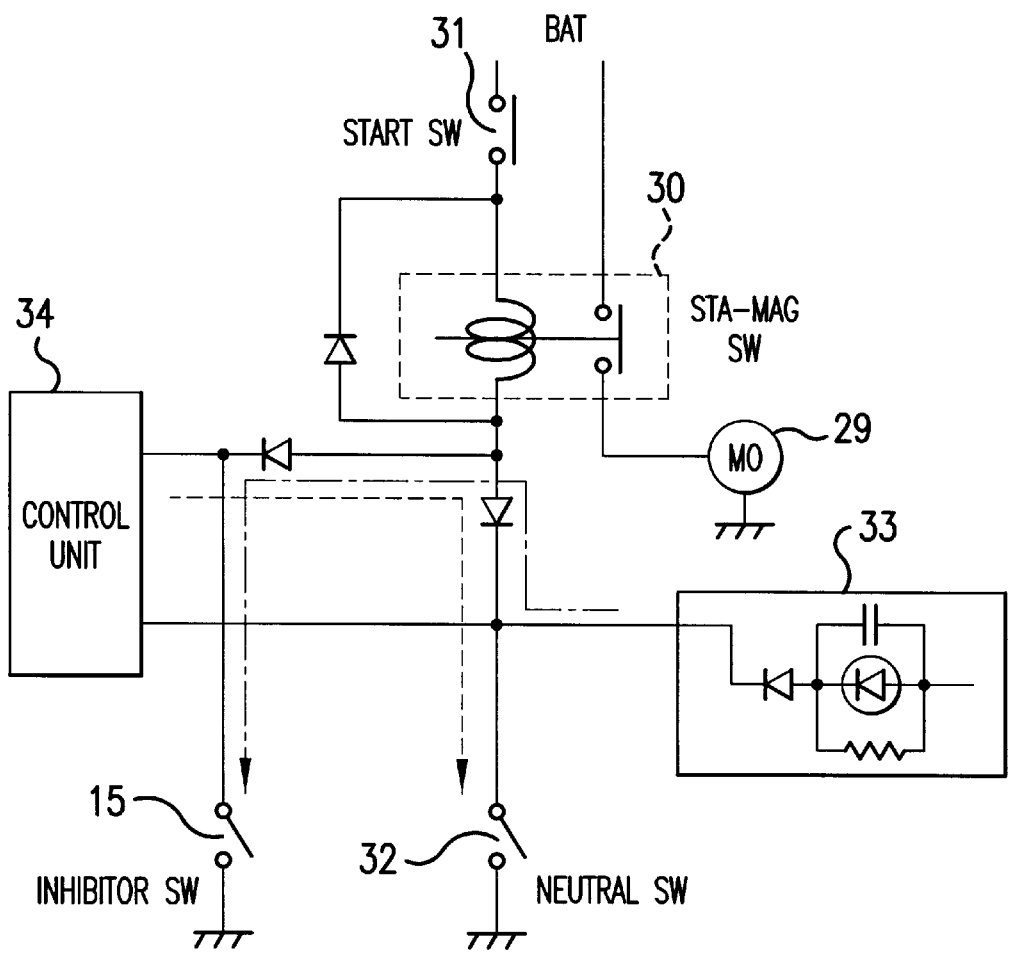
FIG. 8 is a system diagram of an inhibitor system in the embodiment of the invention.

FIG. 8 is a system diagram of an inhibitor system to which the present embodiment is applied. The inhibitor system comprises a cell motor 29 provided at a side of the engine, and a sta-mag switch 30 for supplying a driving current from a battery (not shown) to the cell motor 29. A start switch 31 is provided for turning on and off a driving current supplied from a battery to the sta-mag switch 30. A neutral switch 32 is provided in series with the start switch 31 with the sta-mag switch 30 therebetween. The inhibitor switch 15 provided in parallel with the neutral switch 32.

A neutral position lamp 33 is provided which is turned on to display a neutral position when the neutral switch 32 is on. A control unit 34 is provided for controlling the driving of the engine.

In the brake lever conjunctive switch according to this embodiment constructed as described above, in the condition where the brake lever 12 is not operated, the operating pins 18, 19 of the switches 14, 15 are kept pressed down by the first contact member 16 and the second contact member 17, as shown in FIG. 3 and FIG. 5. In this condition, a brake lamp is not turned on, and the inhibitor switch 15 is turned off, whereby starting or restarting of the engine is restrained.

When a braking operation is performed during normal running or the like, the first contact member 16 is moved by the brake lever 12 away from the brake lamp switch 14, and the brake lamp is turned on. Where the angle of turning of the brake lever 12 is not more than a predetermined angle, the second contact member 17 continues pressing down the operating pin 19 of the inhibitor switch 15.

Two methods of starting the engine in the present embodiment will now be described. In one of the two starting methods, a transmission provided at a side of the engine is first set into a neutral position and the neutral switch 32 is turned on. When the start switch 31 is turned on in this condition, the sta-mag switch 30 is connected to the battery through the start switch 31 and the neutral switch 32, whereby a driving current is supplied from the battery to the sta-mag switch 30, and the sta-mag switch 30 is turned on. As a result, a driving current is supplied to the cell motor 29 through the sta-mag switch 30, and the engine is started. Such a method of starting the engine is often used at the time of starting use of the vehicle 1.

Figure 6:
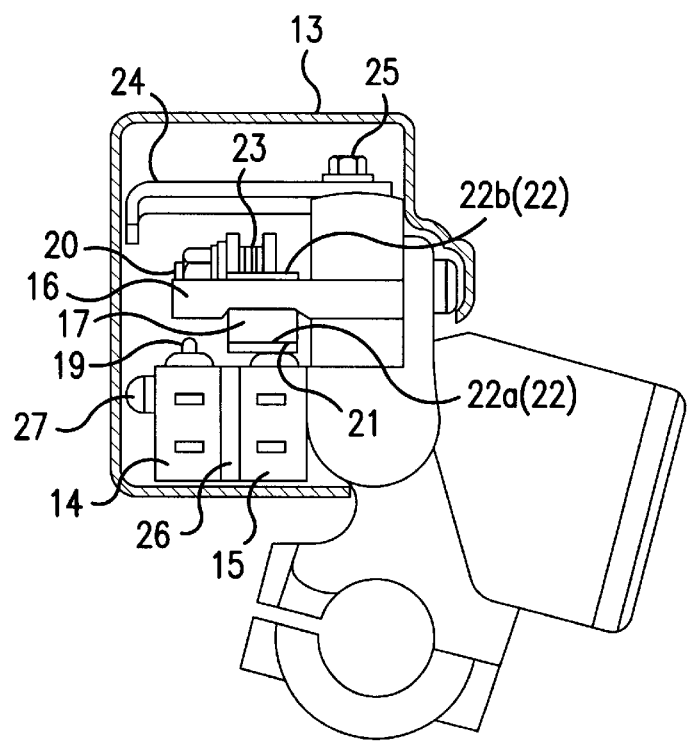
FIG. 6 is a sectional view taken along line B—B of FIG. 3, for illustrating the operation of the embodiment of the invention in a second position.
Figure 7:
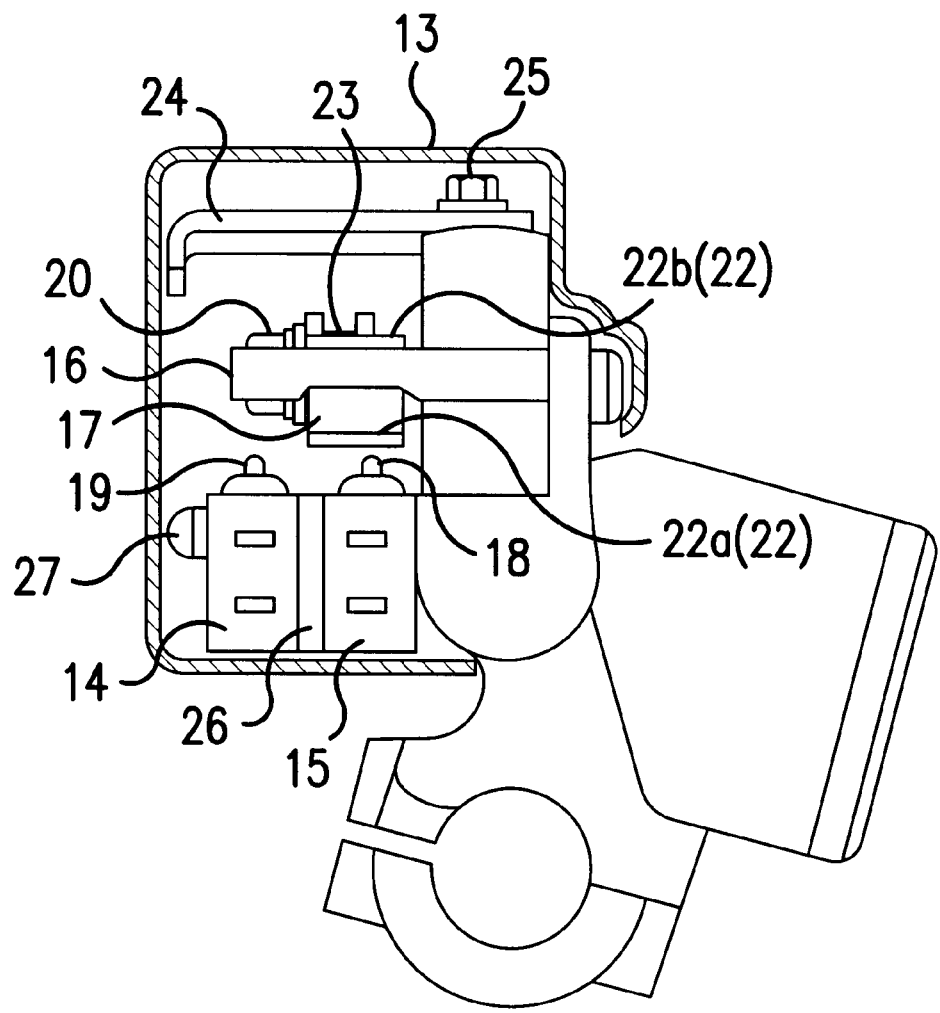
FIG. 7 is a sectional view taken along line B—B of FIG. 3, for illustrating the operation of the embodiment of the invention in a third position.

Next, the other of the starting methods will be described. This starting method is often used at the time of restarting the engine, and is a starting method in the condition where the transmission is maintained in positions other than the neutral position and the reverse position. In the second starting method, the brake lever 12 is first turned by a turning angle not less than that at the time of a normal braking operation. By such an operation, the first contact member 16 is further moved in the direction away from the switches 14, 15 to make contact with one end portion 22a of the second contact member 17 as shown in FIG. 6. Thereafter, as shown in FIG. 7, the first contact member 16 separates the second contact member 17 from the inhibitor switch 15, and releases the pressing on the operating pin 19 of the inhibitor switch 15. By this, the inhibitor switch 15 is turned on.

When the start switch 31 is turned on in this condition, the sta-mag switch 30 is connected to the battery through the start switch 31 and the inhibitor switch 15. As a result, the sta-mag switch 30 is turned on, and a driving current is supplied to the cell motor 29, whereby starting or restarting of the engine is enabled.

According to the brake lever conjunctive switch device of the embodiment as described above, the same type switches 14, 15 are mounted in parallel in the switch box 13. The brake lever 12 is provided with the first contact member 16 for operating the brake lamp switch 14. The second contact member 17 is provided on the pivotal shaft 20 of the brake lever 12 for operating the inhibitor switch 15 when the brake lever 12 is turned by not less than the predetermined angle. By this arrangement, it is possible to assuredly obtain a mechanism which provides different operation timings of the two switches 14, 15 without any large change in the shape of the switch box 13, and the same type of switches 14, 15 can be provided in parallel in the switch box 13.

The shapes, dimensions and the like of component parts illustrated in the embodiment are given by way of example, and modifications thereof can be made based on design requirement and the like.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A brake lever conjunctive switch device comprising:
   a switch box;
   a brake lever pivotally attached to said switch box;
   a first switch and a second switch mounted in said switch box, said switches being disposed in parallel along a pivot axis of said brake lever;
   a first contact member provided on said brake lever for operating said first switch when said brake lever is turned by a predetermined angle; and
   a second contact member provided on the axis of turning of said brake lever for operating the second switch, said second contact member being oscillated by said brake lever when said brake lever is turned by not less than said predetermined angle.

2. The brake lever conjunctive switch device as set forth in claim 1, wherein said second contact member is provided with a contact piece opposed to said first contact member with a predetermined interval therebetween along the direction of oscillation thereof, and said first contact member is brought into contact with said contact piece, whereby said second contact piece is oscillated when said brake lever is turned by not less than said predetermined angle.

3. The brake lever conjunctive switch device as set forth in claim 1, wherein said first switch is a stop lamp switch, and said second switch is an inhibitor switch.

4. The brake lever conjunctive switch device as set forth in: claim 1, wherein said second contact member has a U-shaped cross section including a first end portion and a second end portion spaced apart from one another.

5. The brake lever conjunctive switch device as set forth in claim 4, wherein said first contact member is arranged between said first end portion and said second end portion of said second contact member.

6. The brake lever conjunctive switch device as set forth in claim 4, wherein said first contact member includes a cutaway portion, and said first end portion of said second contact member passes through said cutaway portion.

7. The brake lever conjunctive switch device as set forth in claim 1, wherein said first contact member extends orthogonally from said brake lever.

8. The brake lever conjunctive switch device as set forth in claim 1, further comprising a pivot shaft for pivotally mounting said brake lever to said switch box.

9. The brake lever conjunctive switch device as set forth in claim 8, wherein said first contact member extends from said brake lever in a direction parallel to said pivot shaft.

10. A brake lever switch device comprising:
    a housing;
    a brake lever pivotally attached to said housing by a pivot shaft;
    a first switch attached to said housing;
    a first contact member provided on said brake lever for operating said first switch when said brake lever is pivoted by a predetermined angle;
    a second switch attached to said housing; and
    a second contact member provided on said shaft for operating the second switch, said second contact member being oscillated by said brake lever when said brake lever is pivoted by more than said predetermined angle.

11. The brake lever switch device as set forth in claim 10, wherein said first switch and said second switch are mounted in said housing one beside another parallel to, a pivot axis of said brake lever.

12. The brake lever switch device as set forth in claim 10, wherein said second contact member has a U-shaped cross section including a first end portion and a second end portion spaced apart from one another.

13. The brake lever switch device as set forth in claim 12, wherein said first contact member is arranged between said first end portion and said second end portion of said second contact member.

14. The brake lever switch device as set forth in claim 12, wherein said first contact member includes a cutaway portion, and said first end portion of said second contact member passes through said cutaway portion.

15. The brake lever switch device as set forth in claim 10, wherein said first contact member extends orthogonally from said brake lever.

16. The brake lever switch device as set forth in claim 10, wherein said first contact member extends from said brake lever in a direction parallel to said pivot shaft.

17. The brake lever switch device as set forth in claim 10, wherein said first switch is a stop lamp switch for actuating a stop lamp.

18. A brake lever switch device comprising:
    a housing;
    a brake lever pivotally attached to said housing by a pivot shaft;
    a first switch attached to said housing;
    a first contact member provided on said brake lever for operating said first switch when said brake lever is pivoted by a predetermined angle;
    a second switch attached to said housing; and
    a second contact member provided on said pivot shaft for operating the second switch, said second contact member being oscillated by said brake lever when said brake lever is pivoted by more than said predetermined angle, said second contact member having a U-shaped cross section including a first end portion and a second end portion spaced apart from one another, said first contact member being arranged between said first end portion and said second end portion of said second contact member.

19. The brake lever switch device as set forth in claim 18, wherein said first contact member includes a cutaway portion, said first end portion of said second contact member passing through said cutaway portion.

20. The brake lever switch device as set forth in claim 18, wherein said first contact member extends from said brake lever in a direction parallel to said pivot shaft, and said first switch and said second switch are mounted in said housing one beside another parallel to said first contact member.

* * * * *